March 1, 1927.
R. KILLEFER
DISK CULTIVATOR
Filed May 12, 1924
1,619,208
2 Sheets-Sheet 1
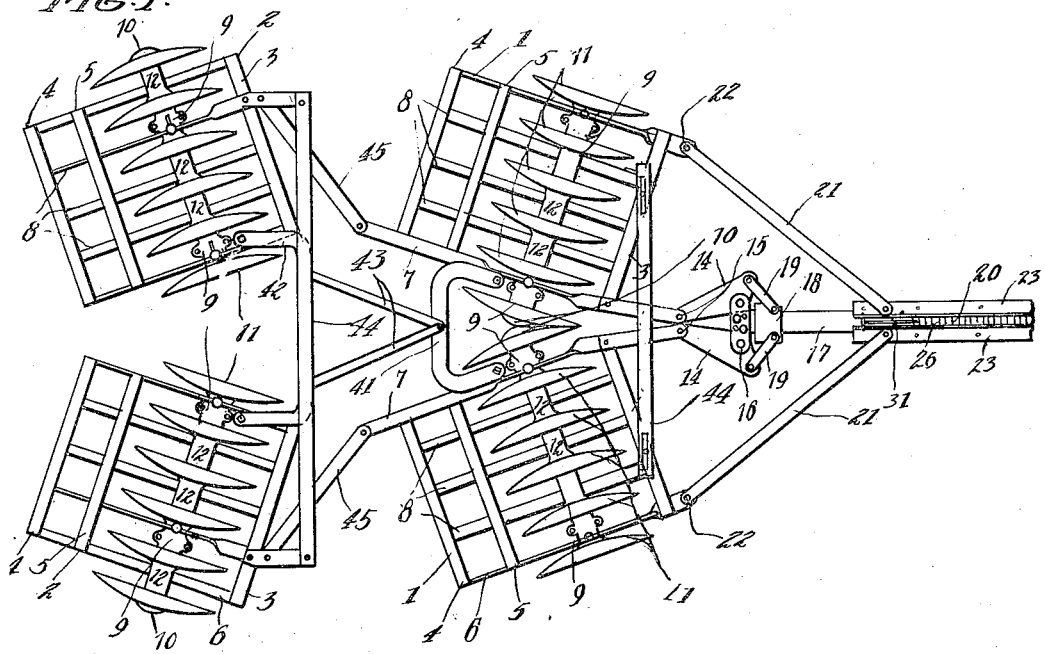
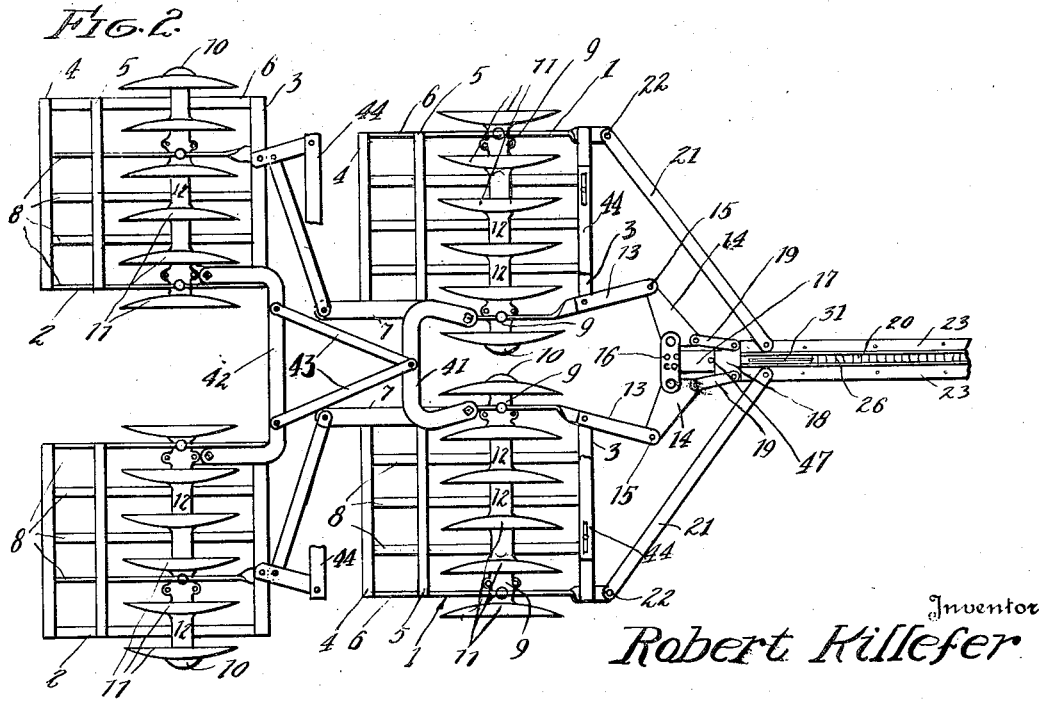
Inventor
Robert Killefer
By Lyon & Lyon
Attorneys March 1, 1927.  1,619,208
R. KILLEFER
DISK CULTIVATOR
Filed May 12, 1924   2 Sheets-Sheet 2
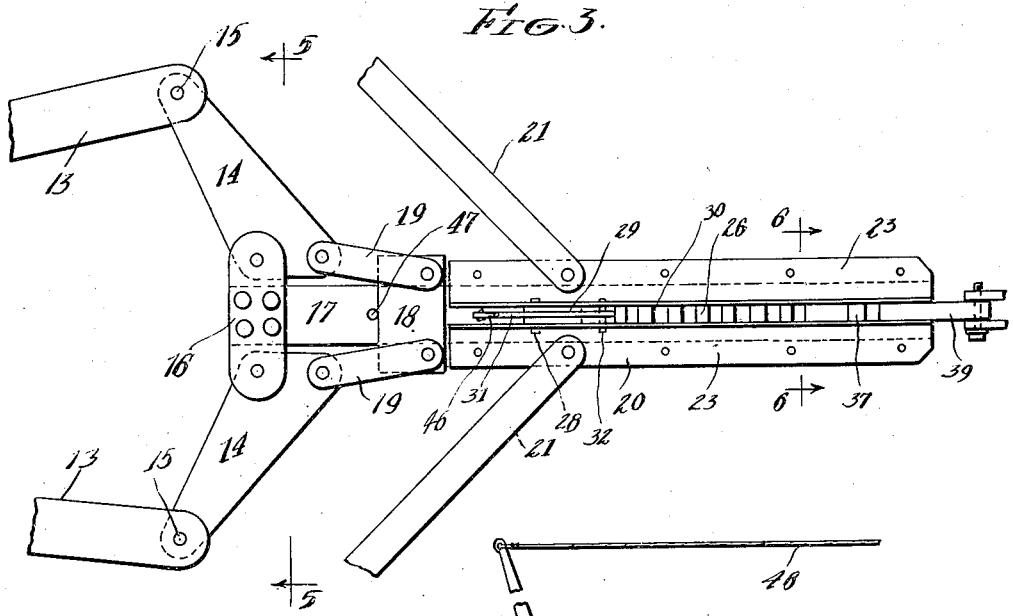
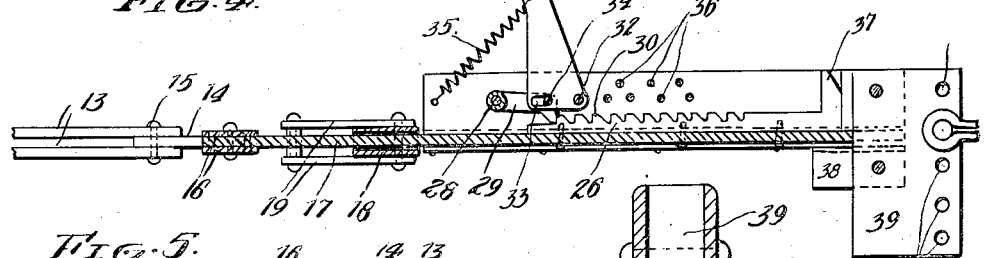
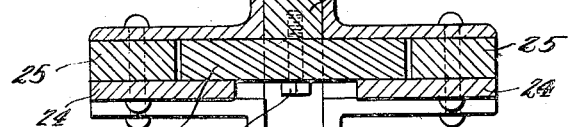
Inventor
Robert Killefer
By Lyon+Lyon
Attorneys Patented Mar. 1, 1927.

1,619,208

UNITED STATES PATENT OFFICE.

ROBERT KILLEFER, OF LOS ANGELES, CALIFORNIA, ASSIGNOR TO THE KILLEFER MANUFACTURING COMPANY, OF LOS ANGELES, CALIFORNIA, A CORPORATION OF CALIFORNIA.

DISK CULTIVATOR.

Application filed May 12, 1924. Serial No. 712,639.

This invention relates to cultivators, and is more particularly directed to that type of cultivator having the cultivator frames arranged in paired gangs and provided with means operable from a distance and in connection with the draft of the cultivator over the ground so that the discs or cultivator members carried by the frames may be presented parallel or at varied angles to the direction of travel of the cultivator.

This invention is an improvement on the cultivator for which Letters Patent No. 1,487,412, was granted to Daniel M. Watters on March 18, 1924. The frames of this present cultivator are adapted to be shifted in different angular relations by the pull of the tractor or other draft power and in that respect is similar or is analogous to the cultivator set forth in that particular patent heretofore referred to. However, in this cultivator it has been necessary for the one driving the tractor or the other draft power element to stop the draft of the cultivator in order to adjust the cutting angle of the cultivator members and either back or pull the tractor forward to properly space the draft bars in relation to the draft connection with the cultivator frames before any adjustment could be effected. It has also been found difficult to properly adjust the cutting angles of the cultivator members in that particular cultivator and it has been necessary for the operator to leave the seat of the tractor or draft device to properly engage a link of the chain with the hook. When approaching a tree, or when it is desired to make a sharp curve, it has been very difficult to either get close to the tree or make the said sharp turn, due to the fact that with the use of the chain draft as illustrated in that patent heretofore referred to, it has not been possible to back the cultivator when the same has come too close to a tree or other vegetation, or in a sharp curve of the field being cultivated.

An object of this invention is to provide a disk cultivator and shaft connection therefore in which the parts are so constructed and assembled as to enable an easy shifting of the cutting angle of the disks from a tractor seat, or the seat of a similar draft device, without the necessity of the operator leaving the seat of the tractor and which shifting means are positive in operation and provide a means for rigidly holding the respective parts of the implement in any adjusted position.

Another object of this invention is to provide a construction of great durability.

Another object of this invention is to provide a cultivator which is inexpensive in construction and of comparatively simple operation.

Other objects and advantages will be apparent from the following detailed description of a preferred embodiment thereof as illustrated in the accompanying drawings.

In the drawings:

Fig. 1 is a plan view of a cultivator embodying this invention illustrating the parts angled to a cutting position.

Fig. 2 is a plan view thereof, the frames of each gang being in alignment with one another for operating over the ground without cultivating.

Fig. 3 is an enlarged fragmental plan view of a slidable draft connection embodying this invention for variation of the angle of the cultivator members.

Fig. 4 is a sectional side elevation of the draft connection illustrated in Fig. 3.

Fig. 5 is a sectional front elevation taken on the line 5—5 of Fig. 3.

Fig. 6 is a sectional elevation taken on the line 6—6 of Fig. 3.

In this illustration of this invention there are provided a pair of front cultivator frames 1, and a pair of rear cultivator frames 2. Each frame comprises transversely extending front, rear and intermediate bars 3, 4, and 5, and outer end bars 6 fastened to the outer end of the bars 3, 4 and 5. Inner bars 7 are fastened to the inner ends of the bars 3, 4 and 5 and a plurality of longitudinally extending scraper bars 8 are fastened at their ends to the bars 3 and 4, and also fastened intermediate of their ends to the bar 5. Bolted to the end bars 6 and 7 of each frame are bearings 9. The bearings of each frame support an axle 10. Each axle is provided with a series of cultivator members 11, spaced apart by sleeves or spools 12.

It may be desirable to form the axles 10 of square cross section and the disks 11 and sleeves 12 with similar square holes respectively adapted to fit the square portions of the axle for the purpose of preventing the cultivator members 11 from turning relative to the axle 10 on which they are mounted.

Means are provided for connecting the inner ends of front frames with the draftbar 17, which means are vertically rigid but horizontally extendible and are preferably of the following construction:

The inner bar 7, of the front frame, extends forward to form the arms 13, which arms 13 are pivotally connected to the bell crank levers 14, as at 15. The bell crank levers are pivotally connected together by a pair of links 16, which links 16 are riveted or bolted to a slide or draft bar 17. The slide 18 is mounted on the draft bar 17 and is pivotally connected through the links 19 with the bell crank levers 14. A slide frame 20 is adapted to slide on the draft bar 17, the said slide frame 20 being pivotally connected by the bars 21 with the front frames as illustrated at 22, it, however, being obvious that the bars 21 might be pivoted anywhere at any position along the bars 3 of the front frame and are so positioned at the extreme outer end of the bars 3 to provide a greater leverage for ease in operation of the change of angle of the cultivator members. The slide frame 20 is preferably of the following construction:

A pair of angle irons 23 are riveted to a pair of plates 24, there being provided between the angle irons 23 and 24 suitable spacing blocks or irons 25. The angle irons 23 are spaced apart for the ratchet-bar 26, which ratchet-bar 26 is secured to the draft bar 17, in any suitable manner, as illustrated by bolts 27 so that the ratchet-bar 26 may easily be removed and replaced should the same become worn, it being understood, however, that the ratchet-bar 26 might be cast integral with the draft bar 17. Pivoted on a pin 28 between the angle irons 23, is a pawl 29 which pawl is adapted to be engaged with the teeth 30 of the ratchet 26. In order to raise the pawl 29 from engagement with the teeth 30 and to insure engagement of the pawl 29 with the teeth 30 when it is not desired to change the cutting angle of the cultivator members the following means are provided.

An actuating lever 31 is pivoted on a pin 32, a slot 33 being cut in the lever 31 and adapted to receive the pin 34 which pin 34 may be secured to the pawl 29 or be cast as an integral transverse extension thereof. A helical spring 35 is secured to one of the angle irons 23 and to the lever 31 so as to act at all times to insure engagement of the pawl 29 with the teeth 30 of the ratchet 26. A cord or cable 46 is secured to the end of the lever 31 and extends forward to any suitable position for operation.

In some particular instances it may be desirable to restrict the extreme angle to which the cultivator members may be set. For this purpose a plurality of holes 36 are drilled or otherwise cut in the members 23 so that a bolt may be passed therethrough. At the end of the ratchet bar 26 there is a vertical extension 37 which vertical extension 37 is aligned with and may engage the bolt when positioned in the desired hole 36.

A draft connection to the source of motive power for the cultivator is provided and may be of the following construction:

Secured to the end of the slide frame 20 are a pair of short angle irons 38 which angle irons 38 may be riveted to and aligned with the angle irons 23 extending therewith. A plate 39 is positioned between the angle irons 23 and the angle irons 38 and is squarely bolted or riveted thereto as illustrated at 39, there being provided in this plate a plurality of vertically spaced holes 40 into which the bolt of a draft clevis may be passed to properly align the drafting force with the cultivator.

When it is desired to transport this cultivator along a roadway it is absolutely essential that means be provided for positively maintaining the angle of the disks parallel to the direction of travel so that the roadway will not be cut up. Therefore, in connection with this novel draft connection the following means are provided to maintain such an angle of the cutting disks. A hole 47 is drilled or otherwise cut in the draft bar 17 in a position to receive a bolt or similar obstacle to engage the slide 18 to absolutely maintain the slide 18 in its forward position so that it will be impossible for any variation of the angle of the disks to be effected during the travel over the roadway.

As this invention relates primarily to this draft connection in combination with that cultivator as more particularly described in those Letters Patent issued to Daniel M. Watters, March 18, 1924, and bearing the number of 1,487,412, applicant does not deem it necessary to go into the exact construction of this cultivator other than to set forth a few of the features which are particularly adaptable in combination with this invention.

Connecting the inner ends of the front frames 1 is a yoke 41, which yoke 41 is connected to the yoke 42 by means of a pair of bars 43. The yoke 42 connects the inner end of the rear frames 2, it being understood that the yokes 41 and 42 likewise act to aid in the holding of frames in spaced relation. There are also the bars 44 secured to the pairs of frames 1 and 2 to maintain this spaced relation between the frames 2, 2, and 1, 1.

The rear frames 2 are held in spaced relation from the front frames 1 by means of the bars 45, which bars 45 are pivotally connected with the inner bars 7 of the front frame and with the transverse bars 3 of the rear frames 2.

The exact construction and purpose of these connections will be more fully understood by referring to that patent issued to Daniel M. Watters, heretofore referred to.

Assuming the parts in the position as illustrated in Fig. 2, with the pin 47 in position to prevent angling of the gangs of disks or disk carrying frames. The pin 47 is removed and the operator pulls on the flexible connecting member 48, moving the lever 31 forward and raising the pawl 29 from engagement with the rack 26. On forward motion of the draft implement with which the slide frame 20 is connected, the slide frame 20 slides along the draft bar 17 so that a pull is exerted through the bars 21 to the outer carriers of the disk carrying frames 1 so as to pull the said corners forward. During this movement, the inner corners of the disk carrying frames 1 are permitted to move inwardly toward each other through the connection provided by the toggle links 14 with the draft bar 17. The slide 18, with which the toggle links 14 are connected, and the bars 13 provide means for equaling the angling of the disk carrying frames 1 when a forward pull is exerted upon the bars 21, as above set forth, so as to insure that each of the disk carrying frames 1 will be angled an equal amount. This forward pull upon the side frame 20, it will therefore be seen, changes the position of the relative parts of the disk harrow from the position illustrated in Fig. 2 to the position illustrated in Fig. 1.

When the disk carrying frames have been angled the desired amount, the operator releases the flexible connection 48, and the spring 35 pivots the lever 31 on the pin 32, returning the pawl 29 to engagement with the rack 26. The engagement of the pawl 29 with the rack 26 prevents further relative movement of the slide 20 and draft bar 17, thereby holding the disk carrying frames in the desired working position.

When it is desired to straighten the disk carrying frames 1 to the non-disking position, the draft implement is reversed, causing the slide frame 20 to slide rearwardly along the draft bar 17 to impart a push against the outer ends of the disk carrying frames 1 to rock the frames to the straight position illustrated in Fig. 2. This straightening of the frames 1 may be accomplished without actuation of the cable 48 to disengage the pawl 29 from the rack 26, as during this movement the pawl will slide along the rack 26, the rocking of the disk carrying frames 1 being effected through the yoke 41 which maintains the point of connection of the disk carrying frames 1 with the yoke 41 at a predetermined distance apart and the points of connection of the yoke 41 with the disk carrying frame 1 from the pivot points around which the disk carrying frames 1 rock.

Having fully described a preferred embodiment of this invention, it is to be understood that I do not wish to be limited to the exact modification shown which may obviously be varied without departing from the spirit of the appended claims.

What I claim is:

1. A cultivator comprising a front pair of frames, a draft bar, a member slidably mounted on the draft bar, a pair of bell crank levers, each being pivoted at the center to the draft bar, and connected at their forward ends to the slidable member, and pivoted at their other ends to rods secured to the front frames, a slide frame, means for engaging the slide frame with the draft bar, and means adjustably secured to the slide frame for limiting the sliding extension of the draft bar within the slide frame.

2. In an implement of the class described, the combination of a front pair of frames, a draft-bar, a slide frame, a ratchet bar secured to the draft-bar, a pawl pivotally supported by the slide frame, an actuating lever pivotally supported within the slide frame and adapted to actuate the pawl, a control rope secured to the actuating lever, a slide mounted on the draft-bar, a pair of bell-crank levers pivotally secured to the draft-bar, a link pivotally connected to one end of each bell-crank lever and to the latter said slide, bars connecting the opposite end of each of the bell-crank levers and the inner ends of the first said frames, bars connecting the slide frame and the outer ends of the first said frames, and means secured to the slide frame for connecting the same with a draft implement.

3. In an implement of the class described, the combination of a front pair of frames, a draft bar, a slide frame mounted on the draft bar, a ratchet bar secured to the draft bar, a pawl pivotally mounted by the slide frame, an actuating lever pivotally supported within the slide frame and adapted to actuate the pawl, a control rope secured to the actuating lever, a pair of bell-crank levers pivoted at their centers to the draft bar, an element slidably mounted on the draft bar and pivotally secured to the forward ends of the bell-crank levers, and a bar secured to each front frame and pivotally secured to the opposite end of the bell-crank lever on the same side of the draft bar.

4. In an implement of the class described, the combination of a pair of front frames, a draft bar, a slide frame slidably mounted on the draft bar, a yoke pivotally secured to each of the front frames at the adjacent ends thereof, bars pivotally secured to the slide frame and to points near the outer corners of the said front frames, a pair of bell-crank levers, means for pivotally securing the bell-crank levers to the said draft bar at the center of the bell-crank levers and each of said bell-crank levers being pivotally secured at one end to a bar secured to the said front frames, a slide mounted on the draft bar, and means pivotally connecting the other end of each of the said bell-crank levers with the said slide.

Signed at Los Angeles, Calif., this 3rd day of May, 1924.

ROBERT KILLEFER.